Patented Aug. 9, 1949

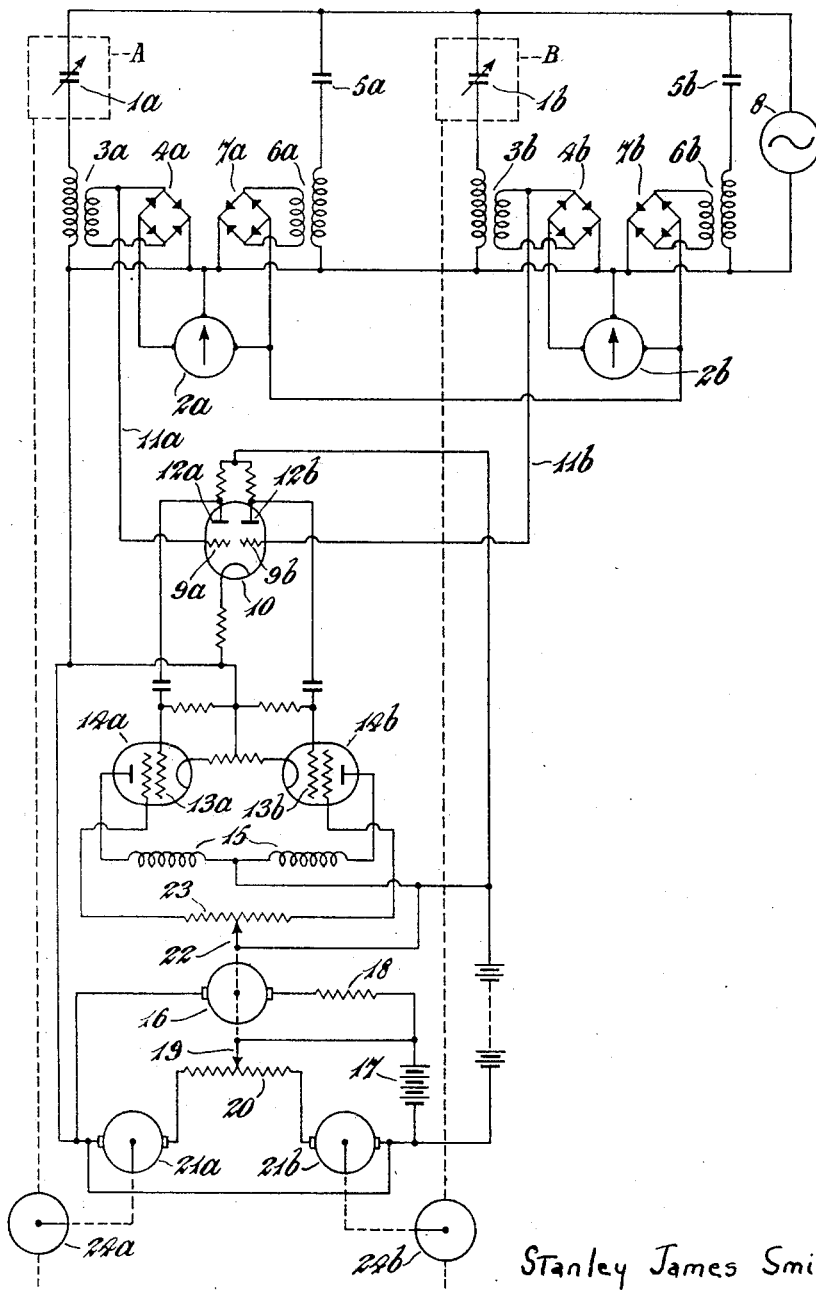

2,478,671

UNITED STATES PATENT OFFICE 2,478,671

SUPPLY SYSTEM FOR LIQUIDS

Stanley J. Smith, Jackson Heights, N. Y., assignor to Simmonds Development Corporation Limited, London, England Application July 9, 1947, Serial No. 759,862
In Great Britain May 16, 1946

Section 1, Public Law 690, August 8, 1946
Patent expires May 16, 1966

7 Claims. (Cl. 103—11)

This invention relates to apparatus for controlling the distribution of liquid and more particularly to fuel supply systems for aircraft of the kind in which the fuel is delivered from the fuel containers to the engine or engines by means of motor driven pumps. Normally each pump serves one or a group of containers, and the containers themselves may be sub-divided into separate cells, all the containers or cells of each group being directly connected with a common feed pipe to a single pump. The expression "tank" as used hereinafter is accordingly to be understood as including all the cells or containers, if there are more than one, that are connected directly as a group with a common feed pipe to a single pump.

It has been found that for various purposes it is desirable to be able to adjust the volumes of fuel in different tanks so that they bear a predetermined relation to one another. For example it may be desirable to maintain the ratio of the volumes constant at all times during flight in order to preserve a predetermined condition of balance.

According to the present invention in a fuel supply system of the kind described the volumes of fuel in two tanks is controlled by apparatus comprising one or more measuring condensers so arranged in each tank that the capacity thereof is substantially proportional to the volume of fuel in the tank, and means responsive to the ratio of the said capacities for varying the relative speeds of the pump motors whereby to maintain the ratio of the volumes of fuel in the tanks at a desired value. Said means may comprise a reversible electric motor controlling the adjustment of rheostats arranged in the circuit of the motors driving the two fuel pumps and means for controlling the speed and direction of rotation of the reversible motor according to the relative magnitudes of the capacities of the measuring condensers whereby the speed and thus the delivery rate of each pump is adjusted to maintain the required fuel distribution in the tanks. The speed and direction of rotation of the reversible motor may be controlled by arranging the field winding of the motor in two parts each connected in the anode circuit of a valve, the bias on which is varied according to the relative magnitudes of the capacities of the measuring condensers. If desired a manual adjustment may be provided for setting up an initial desired fuel distribution, which thereafter is attained and maintained automatically during flight.

Preferably the measuring condensers also operate simultaneously to control liquid contents indicating means for each tank.

One arrangement in accordance with the present invention will now be described with reference to the accompanying drawing in which the sole figure is a wiring diagram of apparatus for controlling the volume of fuel in two tanks A and B.

The tanks A and B are provided with a measuring condenser $1a$ and $1b$ respectively, the capacity of which varies according to the degree of immersion of the condenser in the liquid. Changes in the capacities of the condensers consequent on change in liquid level are indicated by the instruments $2a$ and $2b$ respectively which may be calibrated to show the volume of fuel in the tanks A and B. The measuring system for tank A is identical with that for tank B and since it corresponds to that described and claimed in the specification of Letters Patent No. 2,377,275 it will not be described in detail. Briefly the system for tank A comprises the measuring condenser $1a$ which is connected in series with the primary winding of a transformer $3a$. The secondary winding of this transformer is connected with a full wave rectifier $4a$. A relatively fixed reference condenser $5a$ is similarly connected to transformer $6a$ and full wave rectifier $7a$. Alternating current from source 8 is applied across both the measuring condenser $1a$ and the reference condenser $5a$ and the outputs of the transformers $3a$ and $6a$ are applied after rectification to the indicating instrument $2a$ which is a two coil ratiometer and which gives an indication proportional to the ratio of the currents and hence to the ratio of the magnitudes of the capacities of the two condensers $1a$ and $5a$.

As is well known, the measuring condensers $1a$ and $1b$ may each comprise a number of separate condensers connected in parallel and so shaped and disposed in the tank that irrespective of the cross-section of the tank and the angular position of the tank the total capacity of the measuring condenser will at all times be proportional to the volume of fuel in the tank.

In aircraft fuel is usually withdrawn from the fuel tanks by means of electrically driven pumps which, in spite of care taken during manufacture, tend to have different rates of delivery. Consequently it is found that during flight much more fuel may have been withdrawn from one tank than from another so that an undesirable weight distribution may be set up. This effect is obviated according to the present invention by so controlling the speeds of the pumps that the weight of fuel in the separate tanks either remains equal at all times or else varies during flight according to predetermined conditions. For example when the tanks are arranged in two groups fore and aft of the aircraft it may be desired that the distributed weight of the fuel may be such that for take-off the aircraft shall be nose-heavy, for landing it shall be tail-heavy, while during flight the weight of fuel within the two groups of tanks shall remain equal.

In the form of invention shown in the accompanying drawing the speed of the fuel pumps is controlled in the following manner. The grids 9a, 9b of the twin triode amplifying valve 10 are connected respectively over leads 11a, 11b with the high potential side of the secondary winding of transformers 3a, 3b, so that a voltage proportional to the capacity of measuring condensers 1a and 1b (and hence to the volume of fuel in tanks A and B) is applied to the grids 9a and 9b. The amplified voltages appearing at the anodes 12a, 12b of valve 10 are applied to the grids 13a, 13b of push-pull connected valves 14a, 14b, the anodes of which are connected to the centre tapped field winding 15 of a D. C. motor having an armature 16. The valves 14a, 14b are normally biased to cut-off to act as rectifiers so that their anode currents are proportional to the magnitudes of the voltage applied to the grids 9a, 9b of the twin triode valve 10. If these voltages are equal the anode currents of the valves 14a, 14b will be equal and the resultant flux in the field 15 of the motor will be zero. If however the capacities of condensers 1a, 1b are unequal the voltages applied to the grids 9a, 9b of triode 10 and hence the anode currents of valves 14a, 14b will be unequal and there will then be a resultant flux in the field 15 which will cause the motor to revolve in one direction or the other. As shown the armature 16 of the motor is excited from a source of direct current, shown as battery 17, through a series resistance 18. The armature 16 is connected mechanically, for example through gearing, with the slider 19 of a potential divider 20 so that rotation of the armature will cause the slider 19 to move along the divider in one direction or the other. The ends of the potential divider 20 are connected with the terminals of the electric motors 21a and 21b which drive the fuel pumps 24a and 24b for the tanks A and B respectively while the slider 19 is connected with the battery 17. With these connections with the slider 19 disposed centrally on the divider 20 the speeds of the two motors 21a and 21b will be equal while if the slider is moved by the control motor away from the central position the speed of one pump motor will increase and the speed of the other motor will decrease. Thus if the volumes of fuel in the two tanks A and B become unequal the control motor will operate to speed up the pump withdrawing fuel from the tank containing the greater volume of fuel and slow down the pump withdrawing fuel from the tank containing the lesser volume of fuel.

In order to make the arrangement self-balancing the armature 16 of the control motor is also connected mechanically with the slider 22 of a potential divider 23 arranged so that movement of this slider alters the potential applied to the screen grids of valves 14a, 14b. Movement of the armature 16 will thus control the slope and hence the anode currents of these valves and in a manner opposite to the effect of inequality in the condensers 1a and 1b. An over-riding manual control may be provided for the potential of the screen grids of valves 14a, 14b whereby the system may be adjusted to ensure the maintenance of equal volumes of fuel in the two tanks A and B, or any desired ratio of volumes of fuel. Alternatively such manual control may vary the bias potential applied to valves 14a, 14b or, in well known manner, the gain of the amplifying valve 10.

It will be appreciated that the invention may be applied to arrangements other than in aircraft where it is desired that the ratio of the volume of liquids in two tanks shall remain constant while the tanks are being emptied or even while they are being filled.

I claim:

1. Apparatus for controlling the distribution of liquid between two tanks each connected with a separate motor-driven pump, comprising in each tank an electric condenser whose capacity varies proportionally to the volume of liquid in the tank, and means responsive to the ratio of the capacities of the two condensers for varying the relative speed of the pump motors whereby to maintain the ratio of the volumes of liquid in the tanks at a desired value.

2. Apparatus according to claim 1, wherein said means comprises an adjustable resistance in each pump motor circuit, a reversible electric motor, means whereby rotation of the motor varies inversely the magnitudes of the said adjustable resistance and means for controlling the rotation of the said reversible motor according to the direction and extent of departure of the ratio of the capacities of the said condensers from the desired value.

3. Apparatus according to claim 2, wherein the said reversible motor comprises a field winding arranged in two sections and the means for controlling the rotation of said reversible motor comprises two valves, one section of the field winding being connected in the anode circuit of one valve and the other section of the field winding being connected in the anode circuit of the other valve, and means for varying the anode currents of the valves inversely according to the departure of the ratio of the capacities of the said condensers from the desired value.

4. Apparatus according to claim 3, including means for controlling the said anode currents and connected to the said reversible motor whereby the system is rendered self-balancing.

5. Apparatus for indicating the volume of liquid in two tanks each connected with a separate motor-driven pump and simultaneously for controlling the delivery of liquid from the tanks by the pumps, comprising in each tank an electric condenser the capacity of which varies in proportion to the volume of liquid in the tank, an indicator for each tank, means for controlling the indicator of each tank in accordance with variation in the capacity of its condenser, and means responsive to the ratio of the said capacities for varying the relative speeds of the pump motors whereby to maintain the ratio of the volumes of liquid in the two tanks at a desired value.

6. Apparatus for indicating the volume of liquid in two tanks each connected with means for varying the volume of liquid in the tank and simultaneously for controlling the variation of the volume of liquid in the tanks, comprising in each tank an electric condenser the capacity of which varies in proportion to the volume of liquid in the tank, an indicator for each tank, means for controlling the indicator of each tank in accordance with variation in the capacity of its condenser, and means responsive to the ratio of the said capacities for controlling the means for varying the volume of liquid in the tanks whereby to maintain the ratio of the volumes of liquid in the two tanks at a desired value.

7. Apparatus as claimed in claim 6, including a source of alternating current across which the said condensers are connected, valves in said means responsive to the ratio of the capacities of the condensers, and means whereby the currents applied to the condensers control simultaneously the indicators and the anode currents of said valves.

STANLEY J. SMITH.

REFERENCES CITED

The following references are of record in the file of this patent:

UNITED STATES PATENTS

| Number | Name | Date |
| --- | --- | --- |
| 1,961,350 | Grunsky | June 5, 1934 |
| 2,063,137 | Whitenack | Dec. 8, 1936 |
| 2,102,140 | Ungar | Dec. 14, 1937 |